United States Patent

Bunch

[11] Patent Number: 5,236,258
[45] Date of Patent: Aug. 17, 1993

[54] TAPE CARTRIDGE DATA STORAGE LIBRARY SYSTEM

[75] Inventor: Vern R. Bunch, Boulder, Colo.

[73] Assignee: Cambridge On-Line Storage, Inc., Reno, Nev.

[21] Appl. No.: 696,895

[22] Filed: May 7, 1991

[51] Int. Cl.⁵ ............................................. A47F 1/04
[52] U.S. Cl. ................................. 312/9.31; 312/9.46; 312/236; 221/6; 360/92
[58] Field of Search ................. 312/9.31, 9.4, 9.46, 312/9.7, 9.9, 213, 236; 221/6, 21, 76; 361/384; 360/92

[56] References Cited

U.S. PATENT DOCUMENTS

| | | | |
|---|---|---|---|
| 3,378,827 | 4/1968 | Hertrich | 360/92 X |
| 4,361,858 | 11/1982 | Chambers | 360/92 |
| 4,539,663 | 9/1985 | Ishibashi et al. | 221/6 X |
| 4,984,228 | 1/1991 | Agostini | |

FOREIGN PATENT DOCUMENTS 273395  11/1989  Japan .................. 361/384
2199022  6/1988  United Kingdom .......... 312/236

Primary Examiner—Kenneth J. Dorner
Assistant Examiner—Brian K. Green
Attorney, Agent, or Firm—Earl C. Hancock

[57] ABSTRACT

Tape cartridges are stored in guides within a plurality of open slots arrayed in a carousel which is mounted for rotation around a tape drive assembly. The cartridges are retrieved and returned with respect to their storage positions by a slider arm extendable from the drive. Cartridges are loadable and removable from the carousel via an access door. The controlling computer or controller detects presence of a jam because of a cartridge not fully nested in its storage position by actuating selected operations of the carousel so as to nudge the cartridge into its fully nested storage position. An air flow pattern is created so as to isolate the data exchanging elements of the tape drive and carousel while cooling all elements not sensitive to contamination from air flow. Light source and photocell detectors are maintained in a relatively rigid relationship so as to reliably detect tape cartridge presence in each storage slot.

11 Claims, 7 Drawing Sheets

TAPE CARTRIDGE DATA STORAGE LIBRARY SYSTEM

BACKGROUND OF THE INVENTION

1. Field of the Invention

This invention relates to apparatus and methods for handling a plurality of data containers which hold data storage media therein. More particularly, the present invention relates to library systems for permitting selection amongst a multiplicity of data storage media containing cartridges. While not necessarily limited thereto, the present invention is particularly useful for automated manipulation of an array of magnetic tape cartridges with respect to a common data interfacing device or devices.

2. Description of the Prior Art

Devices and processes for exchanging information with selected ones of a battery of media have existed for a considerable length of time. Some of the early devices were of the music reproduction varieties which allow automatic selection of a particular recording amongst a series of records retained within a storage area.

The use of optical disks and the like has further enhanced the interest in devices for automatically selecting from a group of such data containing disks. An arrangement for allowing manually loaded disks to interface with either of a dual reproduction apparatus is shown in U.S. Pat. No. 4,984,228 by Agostini.

Magnetic tape continues to represent an attractive digital data storage media especially for large quantities of data as well as for data back up purposes. Various systems for creating massive data storage facilities have existed for many years. Typically such mass data storage systems employ banks of magnetic tape containing cartridges with relatively sophisticated transport mechanisms for selecting and transporting appropriate cartridges for delivery to one or more data exchange locations.

It is highly desirable in data exchanging configurations associated with a computer wherein multiple data storing cartridges are required by the computer to utilize apparatus which transports the next cartridge for utilization to the read/write station concurrently with that station interchanging data with a previously retrieved cartridge. An ideal manner for effecting efficient such date interchanges is to employ two or more data exchanging stations so that one station is producing an interface function with the computer while the other station is mechanically loading the next cartridge required by the computer.

Still further, utilization of carousel type retainers for a plurality of data storage cartridges to interface with dual (and alternately operable) data exchanging systems is likewise known in the prior art.

DISCLOSURE OF THE INVENTION

One feature of the present invention is a method of recovering from jams in a library apparatus having a plurality of storage locations for retaining cartridges. These cartridges are intended to have data stored thereon for interfacing with data exchanging apparatus. For this purpose, the cartridges are moved from the storage locations into the station. The library apparatus and station are movable relative to one another. Relative movement failure between the library and station despite the issuance of a first command for relative movement in a first direction between the library and station is detected. A second command to direct relative movement between the library and the station in a direction opposite said first direction is then issued. This is intended to break a jamming cartridge loose particularly where the rear of the cartridge is oriented in other than a tangential relation to the library apparatus external surface.

Upon detecting that the aforesaid second command was successful in causing relative movement between the library and the station, it is then possible to reinstitute the first command with confidence the originally desired movement will occur.

Camming of cartridge edges extending outward from their storage locations in a direction into the intended storage location is also employed. One way of doing this is to utilize the capstan of a drive motor for the library.

When the data exchanging station has a slider arm for retrieving and returning cartridges with the library, detection of failure of movement between library and station causes engaging of the cartridge with the slider arm for movement to urge the cartridge into the library.

The present invention is particularly useful in conjunction with apparatus having a plurality of storage locations for retaining cartridges having data stored thereon for interfacing with data exchanging apparatus. The cartridges are moved from the storage locations into the station by operation of an arm extendable from the station and wherein the library apparatus and station are movable relative to one another. Failure of the aforementioned relative motion to occur between the station and the library despite issuance of a first movement command is detected. Thereafter the library is motivated so as to ensure that the end of any cartridge in the library facing the station is in alignment with the extendable arm. Then the arm is moved in an outward direction from the station by an amount controlled to ensure return of any cartridge that might have jammed between the station and library to return to a nested position in the library.

Another feature of this invention is apparatus for controlled cooling of a library system which employs a movable element for retaining a plurality of cartridges each containing data storing media capable of data exchanges with a station. The station has a data exchange effecting assembly and circuit elements which require cooling. This apparatus includes a wall forming a hollow chamber around the circuit elements which need cooling. A first enclosure establishes an air flow path from the exterior of the apparatus through the hollow chamber with the air flow returned to the exterior of the apparatus. A second enclosure seals the data exchanging assembly and the library from the air flow path. Accordingly, the cartridges and data exchanging assembly are isolated from contamination associated with the air flow.

The first enclosure can include an air filter at the intake into the air flow path from the exterior of the apparatus. A blower is suitably located to establish an exit for the air flow path.

The present invention is especially concerned with a tape cartridge library system employing a rotatable carousel with a plurality of open slots each capable of receiving and storing a tape cartridge. The carousel is movable with respect to a station for performing data exchanging operations in conjunction with the cartridges on the carousel. Apparatus to detect the presence of cartridges in a given position on the carousel includes an assembly of a first wall abutting one side of the carousel with that wall extending into light path obstructing relation on one side of the carousel open slots. A second wall is secured to the first wall and extends therefrom to a position on the opposite side of the open slot. A detector communicates between these walls for detecting whether a cartridge is present in a given open slot.

The detector might employ a light source attached to one of the walls and a photodetector aligned with that light source and attached to the other of the walls. It is also possible to form the first and second walls as a unitary element whereby alignment of the light source and photocell relative to one another is maintained during operation of the apparatus. The light source and photocell makes it possible to sequentially operate the carousel so as to sample the detector for producing an inventory of the cartridges present in the carousel.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
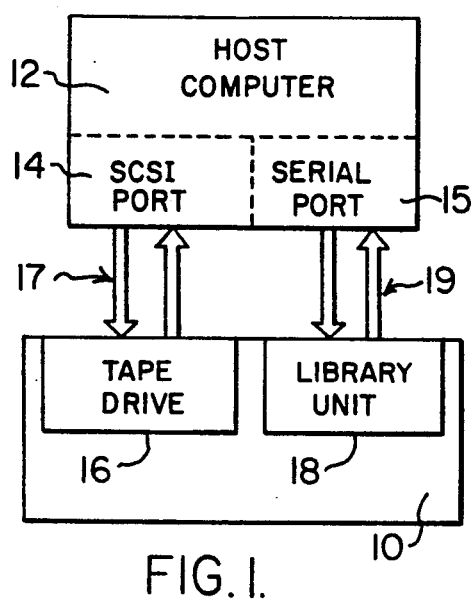
FIG. 1 is a general block diagram showing the electronic interrelationship of one embodiment of this invention.

A system 10, in accordance with one embodiment of this invention, is shown in FIG. 1 in a general block diagram of the format of the electronics involved. System 10 is controlled by commands and establishes data exchanges with host computer 12 by means of a pair of data exchanging ports 14 and 15. The major components of system 10 include a conventional tape drive 16 along with a library unit 18. The tape drive is controlled by a Small Computer System Interface (SCSI) port 14 through interface 17 whereas the library unit is controlled by a serial port 15 through interface 19.

The operation of the library system 10 is fully automatic and requires no operator intervention. An optional second tape drive similar to drive 16 is a potential expansion for the system 10 and likewise is illustrated in FIGS. 2-5. In the typical preferred embodiment shown, host computer 12 reads and writes data to tape drive 16 through the SCSI port 14 while commanding the library unit 18 through serial port 15. Note that it is possible to control both the tape drive and the library unit through a single common data bus interface, such as the SCSI port 14, if adequate intelligence is incorporated in system 10. For instance, host computer 12 might supply the software for operating both the tape drive and the library unit, if desired.

Figure 2:
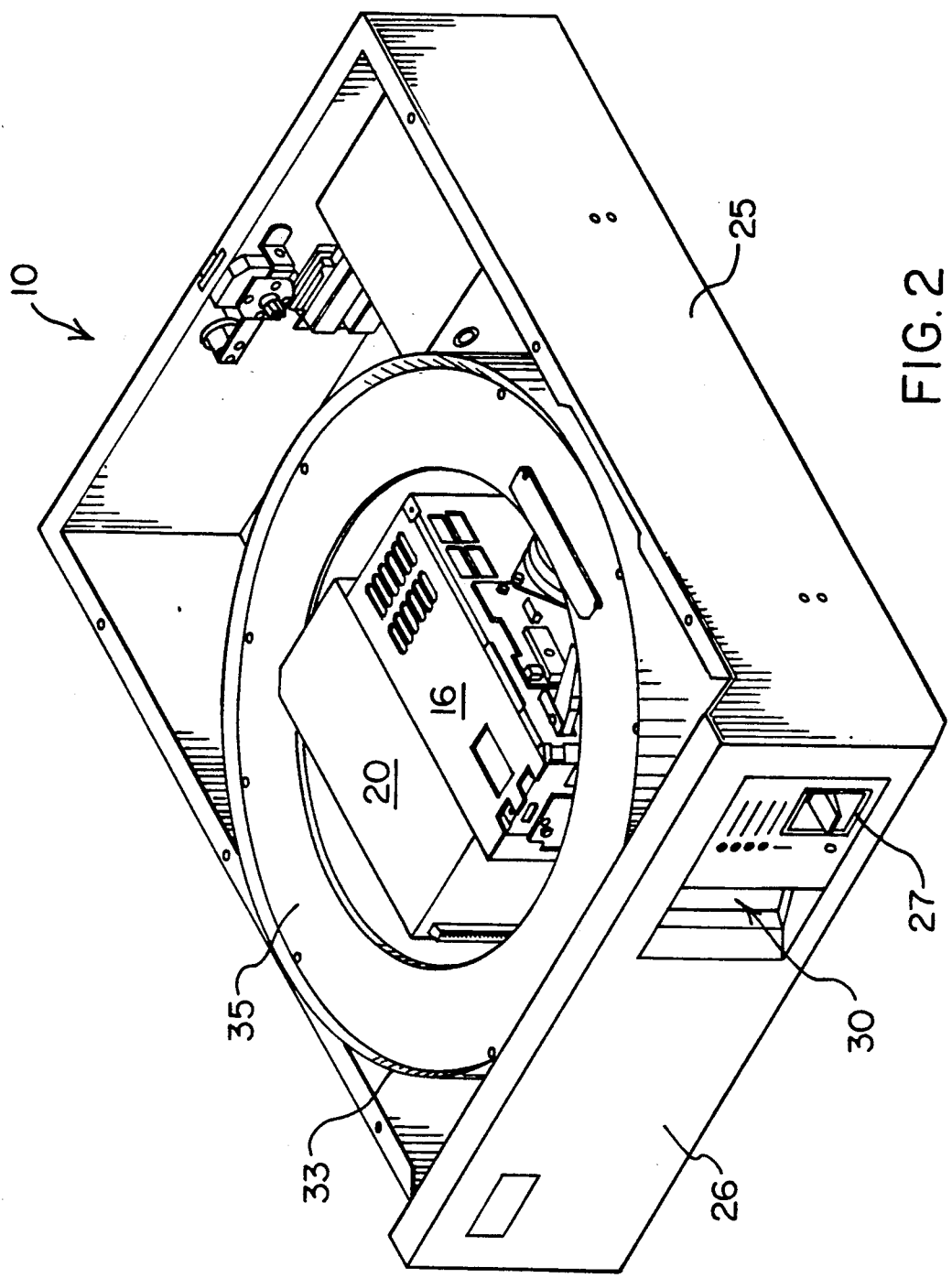
FIG. 2 is an isometric view of a combination tape drive and library unit in accordance with this invention with the top cover removed.

An isometric view of the library system 10 is provided by FIG. 2 wherein the enclosure has its top removed and the cable connections to a remote host computer are not shown. The tape drive 16 is illustrated in some detail, and the potential second tape drive 20 is shown in abutting relationship to the first tape drive 16.

The system enclosure 25 includes a bottom plate, a top (not shown), sidewalls and a front panel 26. The front panel contains typical indicator displays, as well as a power on/off switch 27. Further, a tape insertion door 30 is shown through the face of panel 26 for interfacing into the circular carousel shown generally at 35. The tape drives 16 and 20 are arranged so as to exchange tape cartridges with carousel 35 from opposite directions. The receiving door for tape drive 16 is in fixed alignment with the manual insertion/retraction door 30 whereas the door for drive 20 merely interfaces with the carousel 35. Manual addition or deletion of tape cartridges from the carousel 35 is accomplished through door 30, as is explained below.

Door 30 is automatically actuated by the electronics upon a proper circumstance arising and is closable either by the electronics or manually. A sensor arrangement detects when the door opens and closes to coordinate functioning of the tape drive and library control operations. It is possible for a user to insert a cartridge completely into the tape drive from the external face of panel 26, if desired, although it is generally preferred that the system automatically manipulate the tape cartridges, as is described below.

Figure 3:
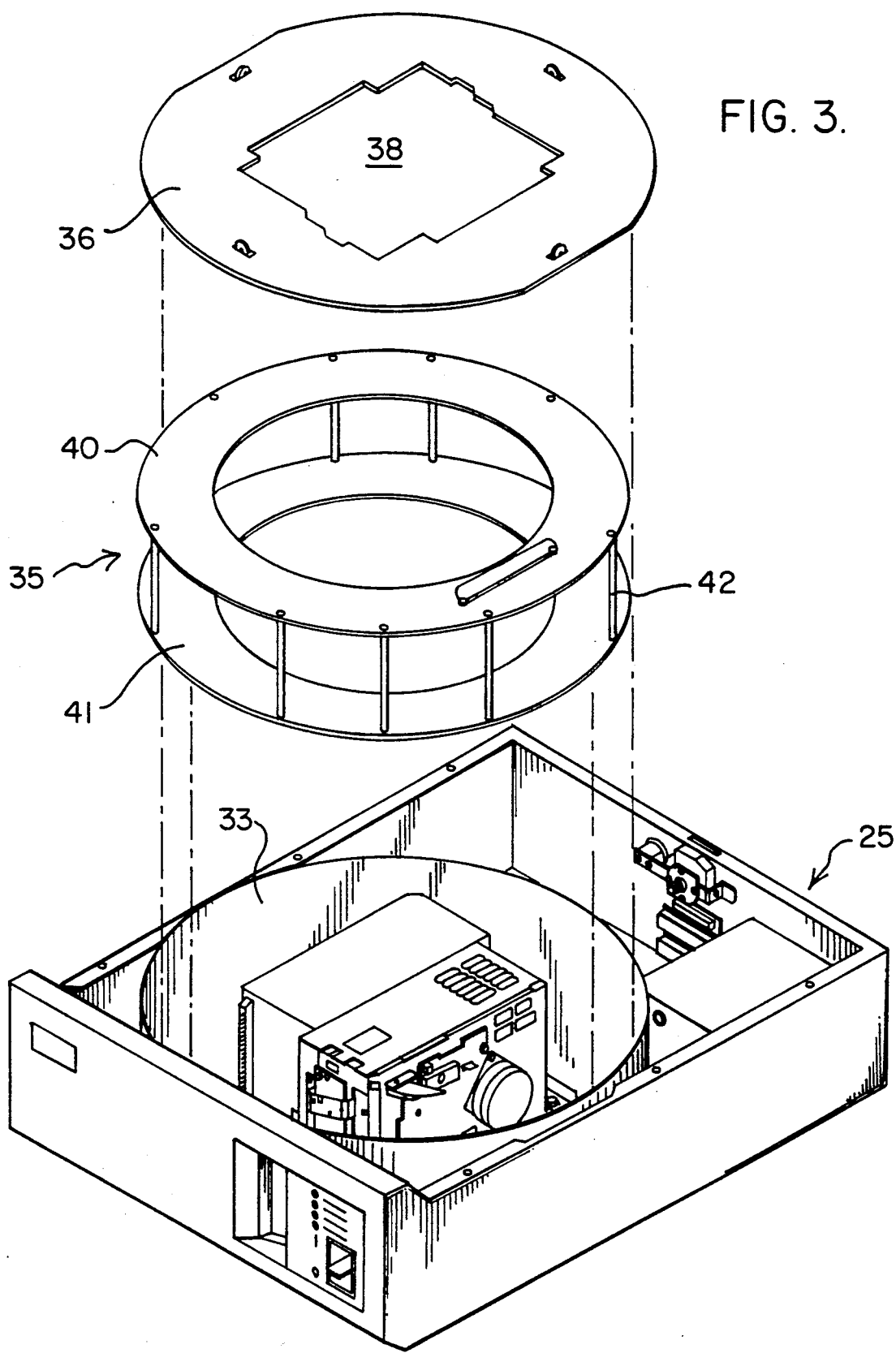
FIG. 3 is a partially exploded view of the cartridge carrying carousel and its cover relative to the remainder of the FIG. 2 unit.

A somewhat exploded view is shown in FIG. 3 wherein a cover 36 (not shown in FIG. 2) is illustrated as normally overlying the carousel 35. Cover 36 includes appropriate rollers to allow carousel 35 to freely rotate but restricts the air flow pattern in a manner described hereinbelow by means of the centrally located opening 38.

Carousel 35 is configured in FIG. 3 with an upper ring 40 and lower ring 41 which are retained in relative position via a series of posts, such as 42. Rings 40 and 41 have positioned thereon a series of appropriately oriented guides which interface towards each other so as to receive cartridges therebetween, as described below.

Figure 4:
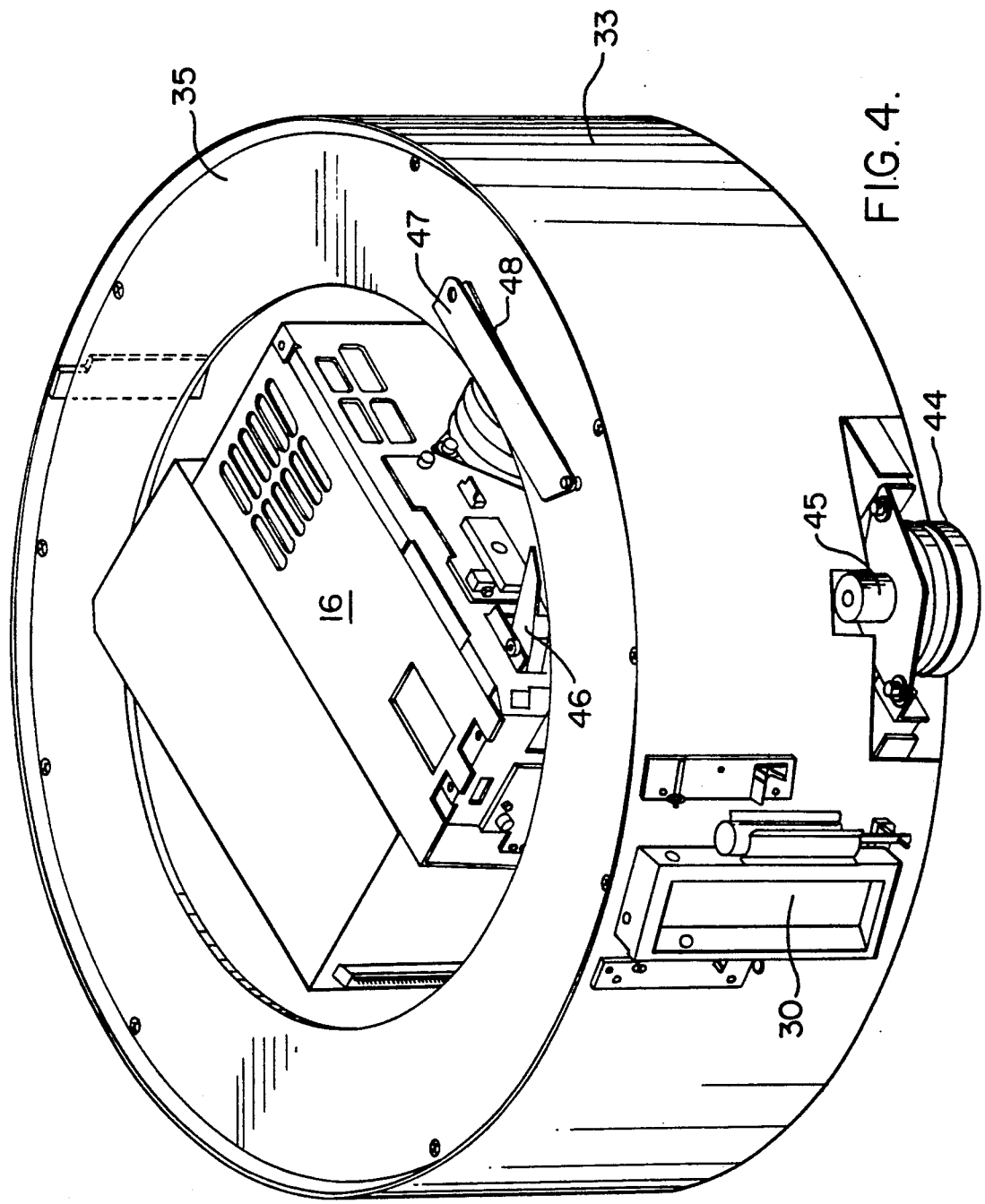
FIG. 4 is an isometric view of the inner retaining ring, carousel and data exchange units of the FIGS. 2 and 3 embodiment.

A collar assembly 33 surrounds the carousel 35 as is visible in FIGS. 2 and 4. FIG. 4 further illustrates that the door 30 is actually attached to collar assembly 33 so as to interface with an opening in front panel 26 of the system enclosure 25. Drive motor 44 applies rotary power to a capstan 45 which engages the peripheral edge of the lower ring 41 and assists in jam recovery as is described later herein.

Tape drive 16 includes a pivotable arm 46 which is arranged to pivot outwards underneath cover 47 below which is a second arm 48 that is spring biased to the storage position, as shown in FIG. 4. When a tape cartridge is completely loaded into tape drive 16, arm 46 is pivoted outwardly over the top surface of upper ring 40 so that it slides under cover 47 and cams arm 48 into a slot in the super structure for tape drive 16 from which arm 46 extends. This action causes the tape received within tape drive 16 to assume a proper read/write relationship for exchanging data with the host computer 12 as is conventional.

In operation, a plurality of tape cartridges are retained within carousel 35. The host computer determines which of those tape cartridges is selected and directs the controller for the library unit 18 to rotate a carousel 35 until the selected cartridge aligns with the opening of the tape drives.

Figure 6:
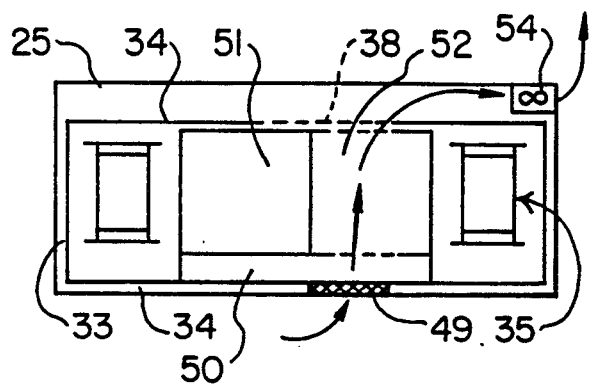
FIG. 6 is a somewhat idealized schematic view of the air flow associated with the FIGS. 2-6 embodiment.

FIG. 6 illustrates somewhat schematically the air flow pattern associated with the preferred embodiment of the present invention. The system enclosure 25 contains the collar assembly 33 which has an enclosed floor 34. A filter element 49 in an opening in outer enclosure 25 allows air to enter a chamber 50 below the tape unit assemblies. The tape unit assemblies are enclosed so as to include a first chamber 51 which contains the tape drive mechanism along with the read/write apparatus and the like, whereas chamber 52 contains the electronics, circuit boards and the like. The upper cover 34, with its opening 38, allows the air to exit from the electronics chamber 52 and to exhaust through blower fan 54 mounted in one of the enclosure walls. Note that the environment of the carousel 35 is likewise isolated from the air flow. This is preferred so as to reduce the possibility of dust, or other particulate contamination entering either the tape cassettes or the area containing the data interfacing apparatus in chamber 51.

Figure 5:
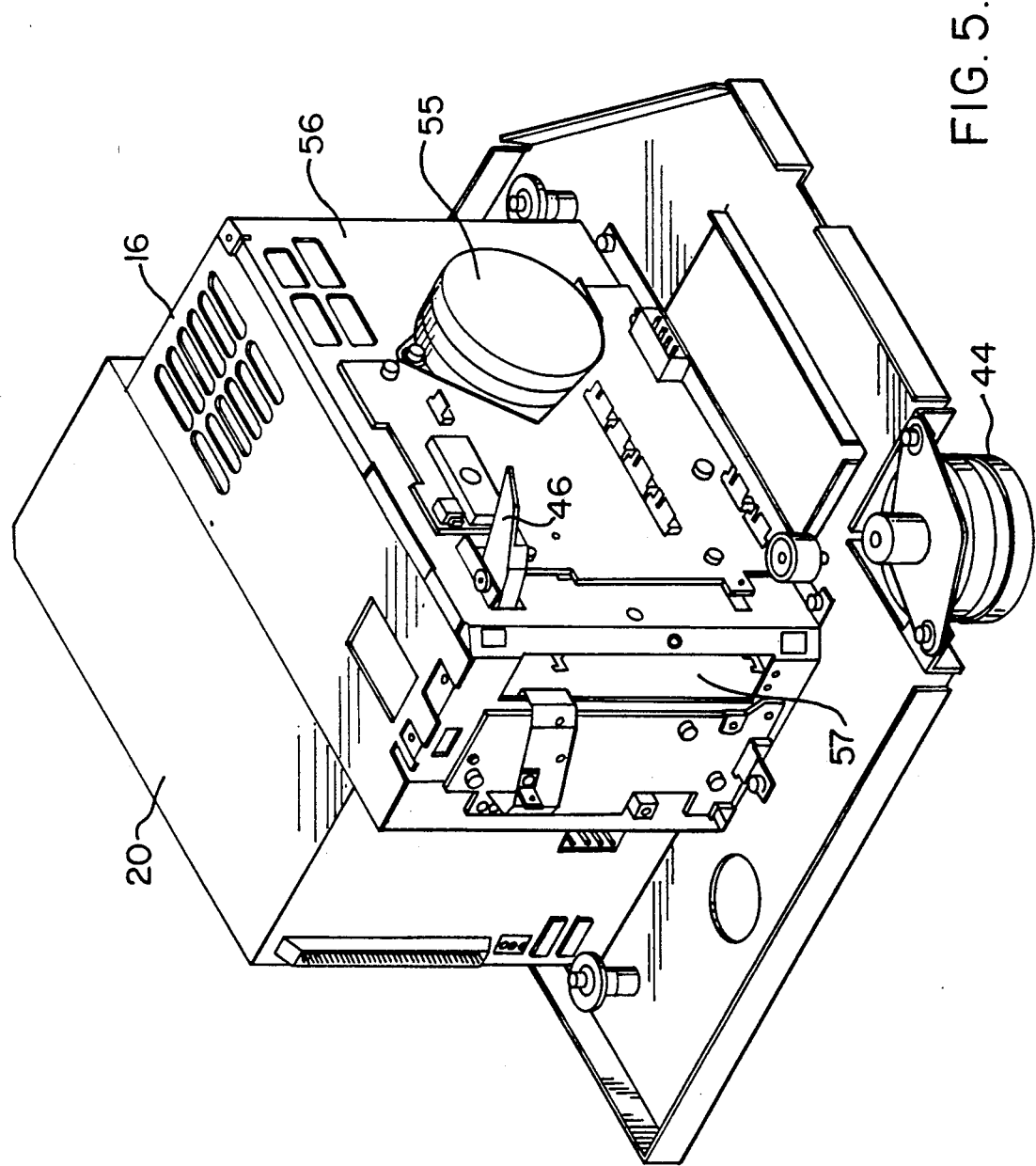
FIG. 5 is an isometric view of the data exchanging units employed in FIGS. 2-4.

The tape drives 16 and 20 are shown removed from the system 10 in FIG. 5. The back-to-back relationship between drives 16 and 20 is somewhat more evident in FIG. 5. A stepper motor 55 is attached to an L-shaped bracket 56 which bracket further contains opening 57 for receiving and ejecting tape cartridges.

Figure 7:
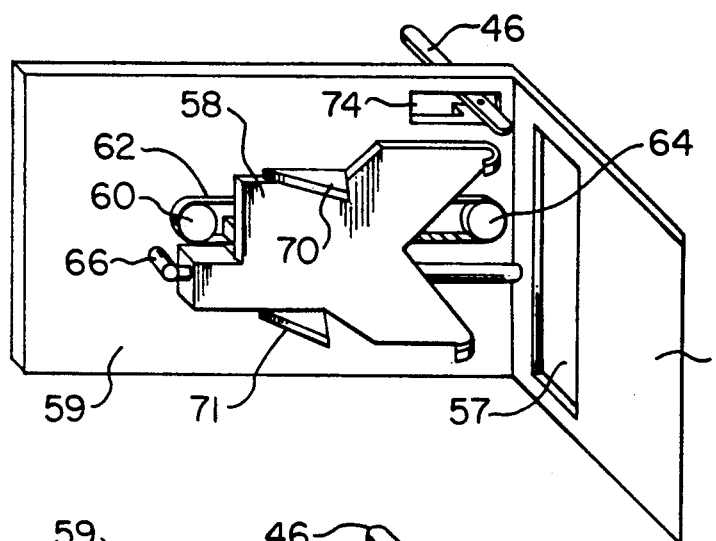
FIGS. 7 and 8 illustrate the operation of the extendable arm for handling and manipulating tape cartridges in accordance with the preferred embodiment.
Figure 8:
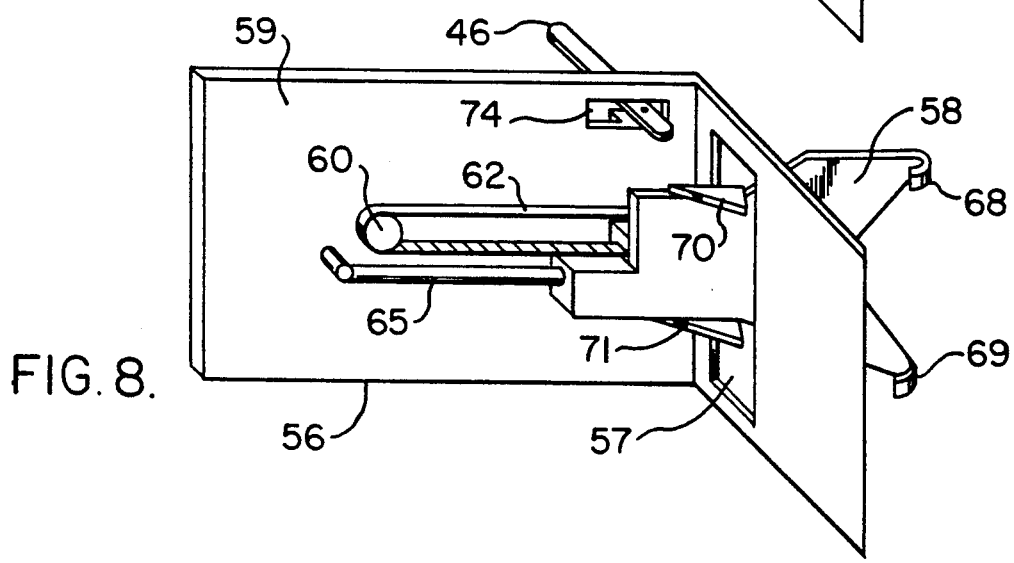

The tape manipulating arm 58 is operationally illustrated in FIGS. 7 and 8 in the retracted and extended position, respectively. Motor 55 on the external side of wall 59 rotates sprocket wheel 60. This rotary motion is translated into lateral movement for arm 58 via toothed belt 62 which is attached to arm 58 and passes over idler roller 64. Arm 58 is guided by sliding on rod 65 with rod 65 attached at one end to the other wall of bracket 56 near slot 57 and to wall 59 by means of stub 66.

Figure 14:
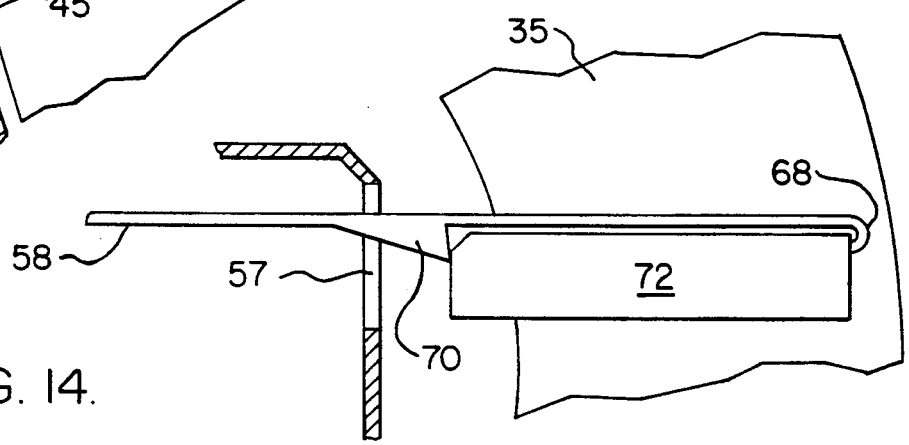
FIG. 14 illustrates the proper relationship between a tape cassette and the extendable arm.

Selection of a tape cartridge is accomplished by rotating carousel 35 until the desired cartridge is approaching door 57. At that time, motor 55 is actuated to drive arm 58 into the space between cartridges and the carousel continues until the cartridge is flush against the arm 58 between fingers 68 and 69 and ears 70 and 71. This is illustrated in FIG. 14 wherein cartridge 72 is in engagement with arm 58.

As mentioned previously, movement of a cartridge into the tape drive unit is followed by further rotation of carousel 35 with arm 46 pivoted out to cam actuator arm 48 into slot 57 thereby actuating the conventional mechanism within the tape drive 16 or 20 to establish data exchanges with the host computer.

Figure 9:
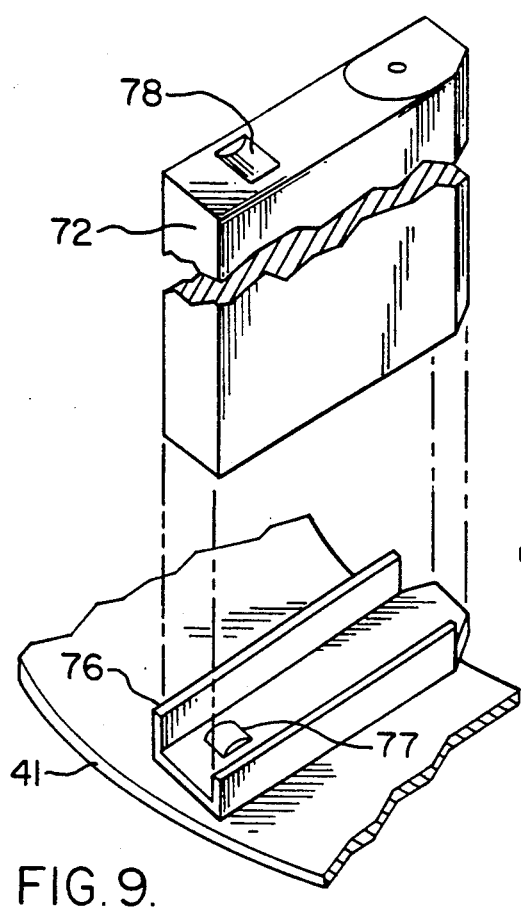
FIG. 9 is a broken and partially sectioned view showing the general interrelationship between a tape cartridge retaining guide and the cartridge itself in association with the carousel.

FIG. 9 shows a typical structure for retaining a conventional tape cartridge in place in the carousel 35. Cartridge 72 fits snugly between the sidewalls of guide 76 attached to lower ring 41. A similar but downwardly facing guide is attached to the upper ring 40 but is not shown in FIG. 9. Each guide has a nub 77 on its inner floor which snaps into a mating notch such as 78 on cartridge 72.

Figure 10:
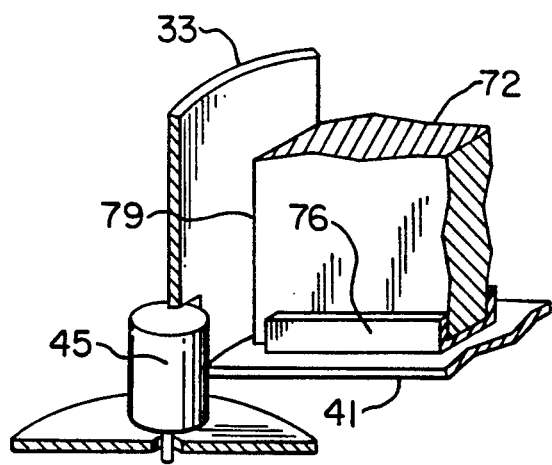
FIG. 10 is a partially broken and sectioned view illustrating the interrelationship between the drive motor capstan, the tape cartridge carousel and the carousel enclosure.

The drive for carousel 35 in the example herein described is a friction drive on the perimeter of lower ring 41 by capstan 45 pursuant to FIG. 10. Capstan 45 protrudes through a notch in collar 33. If cartridge 72 is not fully seated in a radially inward direction into its retaining guides such as 76, rotary motion of carousel 35 ultimately causes the rear wall 79 of cartridge 72 to engage capstan 45. This action forces cartridge 72 inwardly so as to seat properly within the guide 76.

Figure 11:
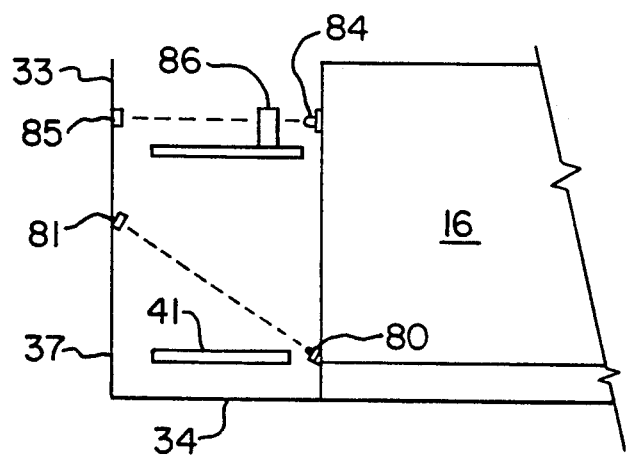
FIG. 11 is a somewhat schematic view illustrating the use of light sources and photocells for monitoring and inventorying the contents of the carousel as well as for appropriately positioning the carousel.

Upon initial power up of system 10, the controller or host computer performs an inventory check to identify each slot in which a cartridge is present. FIG. 11 shows a structure for assisting with this function by detecting which slots contain cartridges and which are vacant. A light source 80 is positioned below the opening for drive 16 and its output is detected by photocell 81. The computer determines when the approximate center of a cartridge bay is reached and samples the output of sensor 81. Note that a bar code reader could replace this sensing arrangement so as to provide even more information to the computer during inventory procedures.

Homing of the system is augmented by light source 84 and photocell 85 in conjunction with one or more identifier stubs or posts 86 on the top of upper ring 40. Preferably collar assembly 33 is constructed with a floor extension 34 which is either securely fastened to the outer wall 37 or is formed as a unitary part thereof. This prevents shifting of the photo detector combinations of 80/81 and 84/85 so as to significantly enhance the reliability of operation of the system.

Figure 12:
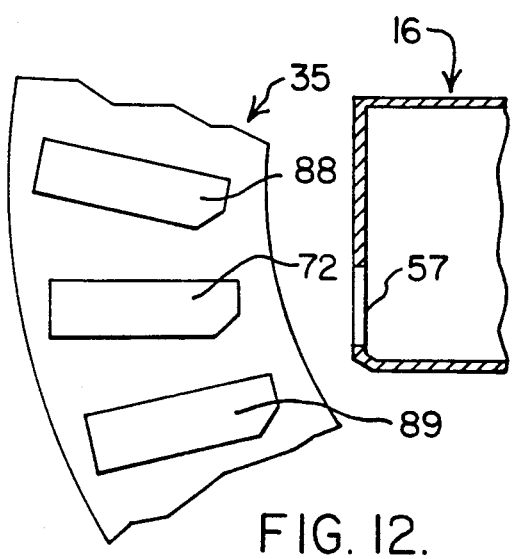
FIG. 12 illustrates the alignment relationship between cassettes retained in the carousel and the door for the retracting arm of the data exchange unit.

The guideways for the cartridges on carousel 35 are aligned with the openings of the tape drive units 16 and 20. This means they are not radially directed towards the axis of rotation of carousel 35. This is best seen in FIG. 12 wherein cartridge 72 is aligned with opening 57 of drive 16. However, its neighbor cartridges 88 and 89 will sequentially align with opening 57 as carousel 35 rotates counterclockwise or clockwise, respectively.

Figure 13:
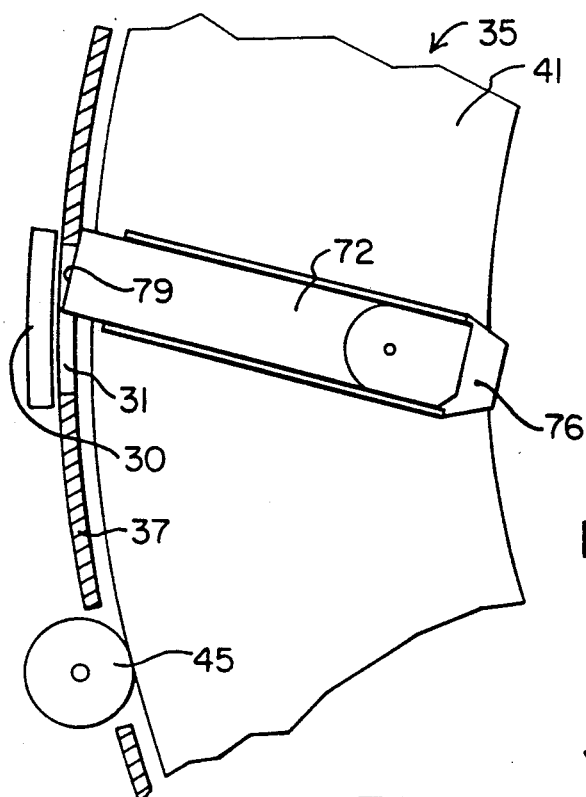
FIG. 13 illustrates the relationship of a tape cartridge which was not fully inserted into the carousel thereby causing a jam.

A particularly attractive feature of the system 10 is its ability to resolve cartridge jamming problems. In FIG. 13, cartridge 72 which was manually inserted through opening 31 followed by closing of door 30 is shown failing to clear the edges of opening 31. Thus attempts to rotate carousel 35 in a counterclockwise direction will cause a jam. Detection of failure of movement by the computer indicates a jam is present which is not damaging since capstan 45 drives ring 41 by friction. The computer then directs the drive motor 44 and thus capstan 45 to reverse rotation. As a result, rear wall 79 encounters the edge of opening 31 thereby urging it inwardly. Completion of seating for cartridge 72 is ultimately effected by capstan 45 engagement as mentioned previously.

Figure 15:
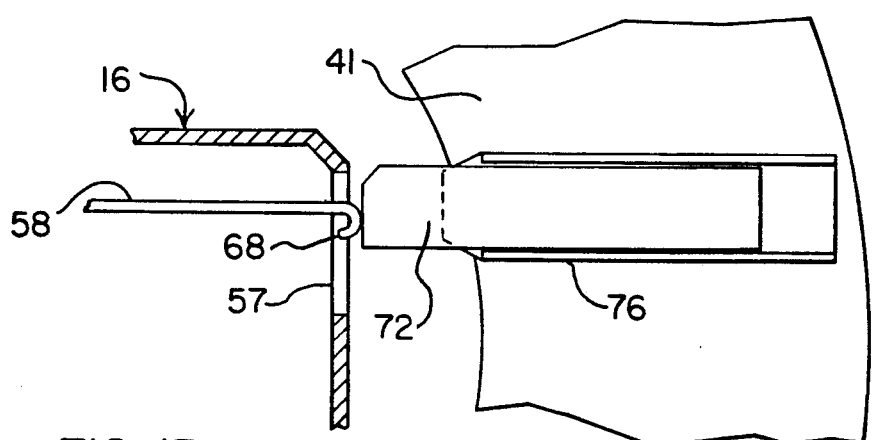
FIG. 15 shows the implementation of the extender arm for the purpose of repositioning a tape cartridge which was inserted too far into the carousel.

Jams associated with failure of a cartridge to completely exit a tape drive unit are resolved as shown in FIG. 15. Here cartridge 72 either was pushed too far inwardly upon loading into the carousel 35 or for some reason failed to completely exit unit 16. As a result, it caught on one of the edges of opening 57. The computer then enables stepper motor 55 so as to move arm 58 outwardly as indicated in FIG. 15 by an amount sufficient to push cartridge 72 back into its nesting position within guide 76.

The optional second tape drive 20 permits faster data transfer, master copying, and tape drive redundancy.

The library subsystem consists of the cartridge storage carousel 35, the library robotics mechanism, the enclosure, the library robotics software and the host interface software. The library unit does not communicate with the tape drive(s) directly. All communication to the tape drive(s) occurs only through a host computer port.

The cartridge storage carousel of each library in a typical configuration can contain forty five 8 mm cartridges or sixty 4 mm cartridges. The carousel 35 is a precision device manufactured to within 0.001" tolerance. It is easily removed and self-aligns when reinserted. Multiple carousels allow quick swapping of data cartridges.

The robotics mechanism includes the electronic and mechanical components to perform automatic cartridge movements. Reliability is enhanced by utilizing a simple integrated electromechanism. No adjustments are required. In one configuration, only seventeen moving parts including springs, motors and rollers were required for a handling 8 mm cartridges whereas the 4 mm cartridge version parts required only fourteen such moving parts.

A stepper motor rotates the carousel at optimum speed and direction to position any of the cartridge slots in front of the selected drive. A second stepper motor mounted on the tape drive slides the cartridge for data read/write operations which occur with coordinated motion of these two motors. Cartridge movements are continuously monitored to within 0.015", thus assuring accurate and trouble-free operations.

Solid state photosensors provide reliable feedback signals for constant self-calibration during motor movements and for instant problem detection. There are only two mechanical switches, the power switch and manual reset switch.

The enclosure 25 contains the robotics mechanism, power supply, and front panel 26. The robotics mechanism is also shock mounted to reduce vibration. Filtered air, coupled with a unique convection system in the robotics mechanism, minimizes dust-related problems. Airflow in the tape drive transport area is nonexistent while the drive electronics are amply cooled. A cover 36 over the carousel 35 affords further dust protection.

An embedded microcontroller (not shown) controls robotics operations. Simple high level commands minimize the host controller programming. Electrical connection for Robotics control and status is preferably through the RS-232 Serial interface port in the embodiment shown. However, an all SCSI port option is acceptable.

Host software interfacing to the library unit, in the monitor mode entails

1. Reading the status bytes in the library unit to obtain information.
2. Setting a few command bytes, i.e. RCOMMAND, in the Library unit RAM by using the Monitor program.
3. Commanding the library unit to perform the operation by executing a "G" Monitor command.

A revised escape character processing is used. If the robotics code is executing a command, a Bell characters is sent to the host/operator, and control remains with the robotics program to allow it to complete any outstanding activities and/or idle down. Upon completion, a one-line message occurs (*** Library Reset), indicating software reset, and the prompt is displayed. If the robotics code is not executing, a Bell character is sent to the host/operator, and a software reset is executed to immediately reset the software environment.

After the cartridge is manually inserted into the library through the access door 30, the INSERT command is issued. All other commands except STATUS are ignored. An EJECT command pops open the front access door 30 and ejects the cartridge in the current slot through access door 30. The cartridge is then manually removed from the library. If the current slot is empty the library is ready to accept a new cartridge. After a cartridge is manually inserted, an INSERT command is issued. All other commands except STATUS are ignored.

A new cartridge is inserted by pushing it inside until the cartridge trailing edge lines up with the rear of the back slot guide. The access door is then closed until it clicks shut. The library unit will properly recalibrate the cartridge and carousel. The INSERT command is executed in sequence after the EJECT command when the access door is closed. The only allowable commands after EJECT are INSERT and STATUS.

Prior to any movement the door is manually closed, so the carousel can align the slot with drive 16. The INSERT command is only allowed following an EJECT command process and the access door is closed.

The LOAD command loads the cartridge in the current slot into the drive and mounts it, making it ready for data read, write, and search operations. The LOAD command fully loads the cartridge into the drive which is commercially available from the Exabyte Corporation of Boulder, Colo. To enable the removal of the cartridge requires sending a SCSI UNLOAD command from host 12. This UNLOAD cycles the drive down and ejects the cartridge to an accessible position in its loader. The CTD UNLOAD can access the cartridge once it is ejected into the tape drive loader slot.

The INVENTORY command physically determines which slots contain cartridges. The SLOT command rotates the carousel to position the new requested slot in front of the selected drive for loading, unloading, accepting, or ejecting.

The UNLOAD command moves the unmounted cartridge from the tape drive to the carousel slot indicated by the RAM variable RS1CART or RS2CART. To work properly, there must be a cartridge in the drive, but in an unmounted position. The host computer normally will have issued an UNLOAD (unlatch) command to the tape drive via the SCSI port. Since the tape cartridge may not be physically unmounted for a period of time thereafter, the host may continue to issue the UNLOAD command to the library unit. The library unit responds with an error message "cartridge still latched in drive".

The UNLOAD command is not processed if any of the following conditions are detected:
1. The selected slot for unloading is occupied.
2. RAM variable RS1CART (or RS2CART), is zero, indicating that a cartridge is not inside the corresponding drive.
3. The slider sensor is ON, indicating that either:
   a. no cartridge is in the drive, or
   b. the cartridge is fully seated in the drive and has not been unmounted The command letters in the following table are the characters for the ASCII codes which are written to location EFOO to select the specified function.

| Cmd | Name | Function |
| --- | --- | --- |
| C | CARTIN | Slide the current cartridge into drive |
| D | DRIVE | Select Drive 1 or 2 |
| E | EJECT | Eject cartridge out of the library unit |
| F | FINGER | Latch the cartridge into the drive |
| H | HOME | Calibrate the carousel, "home" to slot 1 |
| I | INSERT | Terminate EJECT |
| J | JOGSLOT | Align current slot with selected drive |
| L | LOAD | Load and latch the current cartridge into the drive |
| N | INVNTRY | Report physical status of cartridge, which slots contain cartridge |
| R | ROTARAM | [1] Set motor rate |
| S | SLOT | [2] Select slot for operation |
| T | TEST | Tests slider, carousel and sensors |
| U | UNLOAD | Unload unlatched cartridge from the drive |
| Z | STATUS | Display RAM values for host reading |

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. A method of recovering from jams in a library apparatus having a plurality of storage locations for retaining cartridges having data stored thereon for interfacing with data exchanging apparatus at a station wherein the cartridges are moved from the storage locations into the station and wherein the storage locations and station are movable relative to one another upon command comprising the steps of
   generating a first command to actuate a means for establishing relative movement in a first direction between the storage locations and the station,
   providing means for detecting that relative movement between the storage locations and the station has failed to occur despite the generation of said first command for relative movement in a first direction between the storage locations and the station,
   issuing a second command to said actuation means for establishing relative movement between the storage locations and the station in a direction opposite said first direction, and
   further including the step of providing means for camming a cartridge in a direction into one of said storage locations.

2. The method in accordance with claim 1 which includes the step of reinstituting said first command step upon detecting that said second command was successful in causing relative movement between the storage locations and the station.

3. The method in accordance with claim 1 wherein said providing step further includes a step of enabling said camming means for camming cartridge edges extending outward from their storage locations in a direction into said storage location from which the cartridge extends.

4. The method in accordance with claim 1 wherein the station has a slider arm for retrieving and returning cartridges with the storage locations and including the steps of responding to said detecting step by engaging the cartridge with the slider arm for movement into one of said storage locations.

5. A method of recovering from jams in a library apparatus having a plurality of storage locations for retaining cartridges each having an end and having data stored thereon for interfacing with data exchanging apparatus at a station wherein the cartridges are moved from the storage locations into the station by operation of an arm extendable from the station and wherein the storage locations and station are movable relative to one another on command comprising the steps of
   detecting that relative motion has not occurred between the station and the storage locations despite issuance of a first movement command,
   motivating the library apparatus so that the end of any cartridge in the storage location facing the station is in alignment with the extendable arm, and
   moving the arm in an outward direction in order to provide a means for moving any cartridge jammed between the station and storage locations into one of the storage locations.

6. Apparatus for controlled cooling of a library system for storing data comprising
   means for retaining a plurality of cartridges each containing data storing media,
   a station having means for exchanging data with said media and having circuit elements that require cooling,
   a wall forming a hollow chamber around said circuit elements and having an opening thereinto,
   a second with having a first aperture for establishing an air flow path from the exterior of the apparatus through said opening into said hollow chamber and returned to an exit port,
   a housing forming a chamber between said first enclosure exit port and a second aperture opening to the exterior of the apparatus,
   an enclosure sealing said cartridge retaining means from said air flow path and said housing chamber,
   blower means for motivating air from the exterior of the apparatus through said air flow path from one of said apertures to the other of said apertures, and
   means at the said one of said apertures for filtering said received air prior to entry into said air flow path,
   whereby the cartridges and data exchanging means are isolated from contamination by the air flow.

7. Apparatus in accordance with claim 6 wherein said blower means includes a blower motor for driving air into the said aperture which exhausts air to the exterior of the apparatus.

8. In a tape cartridge library system employing a rotatable carousel having a plurality of open slots each capable of receiving and storing tape cartridges with the carousel movable with respect to a station for performing data exchanging operations in conjunction with the cartridges on the carousel, apparatus for detecting whether cartridges are present in the positions on the carousel comprising an assembly including a first wall extending around said carousel open slots and a second wall secured to said first wall and extending therefrom to a position in proximity to the station on the opposite side of said carousel open slots, and detector means having a pair of elements communicating via a light beam in a line between said first wall and said station for detecting whether a cartridge is present in said open slot whenever said open slot is longitudinally aligned with said detector means communicating line with said pair of elements including a light source and a photocell.

9. Apparatus in accordance with claim 8 wherein said detector means light source is attached to said position in proximity to said station and said photodetector is aligned with said source and attached to said first wall.

10. Apparatus in accordance with claim 9 wherein said first and second walls are formed as a unitary element whereby alignment of said light source and photocell relative to one another is maintained during operation of the apparatus.

11. Apparatus in accordance with claim 8 which includes means for sequentially operating said carousel and for sampling said detector for producing an inventory of the cartridges present in said carousel.

* * * * *